US012416955B2

(12) United States Patent
Messick et al.

(10) Patent No.: US 12,416,955 B2
(45) Date of Patent: Sep. 16, 2025

(54) DYNAMIC PSYS RESISTOR NETWORK FOR IMPROVED ACCURACY AND REDUCED TRANSIENTS

(71) Applicant: DELL PRODUCTS L.P., Round Rock, TX (US)

(72) Inventors: Doug Messick, Austin, TX (US); Craig Klein, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 18/361,872

(22) Filed: Jul. 30, 2023

(65) Prior Publication Data

US 2025/0038660 A1    Jan. 30, 2025

(51) Int. Cl.
*G06F 1/26* (2006.01)
*G06F 1/28* (2006.01)
*G06F 11/30* (2006.01)

(52) U.S. Cl.
CPC ............... *G06F 1/263* (2013.01); *G06F 1/26* (2013.01); *G06F 1/28* (2013.01); *G06F 11/3058* (2013.01)

(58) Field of Classification Search
CPC ... G06F 1/26; G06F 1/263; G06F 1/28; G06F 1/30; G06F 1/3206; G06F 11/3058; H02M 3/155
See application file for complete search history.

(56) References Cited

U.S. PATENT DOCUMENTS

| | | | |
|---|---|---|---|
| 10,423,202 B2 | 9/2019 | Rotem et al. | |
| 11,368,144 B1* | 6/2022 | Schmitz | H04B 15/00 |
| 11,449,127 B2 | 9/2022 | Gorbatov et al. | |
| 2007/0229024 A1* | 10/2007 | Li | G06F 1/263 |
| | | | 320/111 |
| 2011/0266867 A1* | 11/2011 | Schindler | G06F 1/266 |
| | | | 307/24 |
| 2014/0344588 A1* | 11/2014 | Chou | G06F 1/30 |
| | | | 713/300 |
| 2019/0041951 A1* | 2/2019 | Shapira | G06F 1/3287 |
| 2020/0033925 A1* | 1/2020 | Young | G06F 1/28 |
| 2024/0069612 A1* | 2/2024 | Messick | G06F 1/28 |
| 2024/0111349 A1* | 4/2024 | B S | G06F 1/3296 |
| 2024/0256019 A1* | 8/2024 | Klein | G06F 1/26 |
| 2024/0396350 A1* | 11/2024 | Cheng | H02J 7/0048 |

* cited by examiner

Primary Examiner — Thomas J. Cleary
(74) Attorney, Agent, or Firm — Larson Newman, LLP

(57) ABSTRACT

An information handling system has a regulator, a power indication network, a PSU, and a BMC. The regulator receives a system power level indication and provides power to a processor based upon the power indication. The power indication network includes a first resistor stage to shunt the power indication to a ground plane, and a second resistor stage selectably to shunt the power indication to the ground plane. The PSU provides the power indication as a current output where a level of current output indicates a power level provided by the PSU. The BMC determines a power budget for the information handling system, calculates a number of resistor stages to couple to the ground plane based on the power budget, when the number is less than or equal to one, selects the second resistor stage to be uncoupled from the ground plane, and when the number is greater than one, to select the second resistor stage to be coupled to the ground plane.

20 Claims, 2 Drawing Sheets

DYNAMIC PSYS RESISTOR NETWORK FOR IMPROVED ACCURACY AND REDUCED TRANSIENTS

FIELD OF THE DISCLOSURE

This disclosure generally relates to information handling systems, and more particularly relates to providing a dynamic PSys resistor network for improved accuracy and reduced transients in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may have a regulator, a power indication network, and a PSU. The regulator may receive a system power level indication and provide power to a processor based upon the power indication. The power indication network may include a first resistor stage to shunt the power indication to a ground plane, and a second resistor stage selectably to shunt the power indication to the ground plane. The PSU may provide the power indication as a current output where a level of current output indicates a power level provided by the PSU. A BMC may determine a power budget for the information handling system, calculate a number of resistor stages to couple to the ground plane based on the power budget, when the number is less than or equal to one, select the second resistor stage to be uncoupled from the ground plane, and when the number is greater than one, selects the second resistor stage to be coupled to the ground plane.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
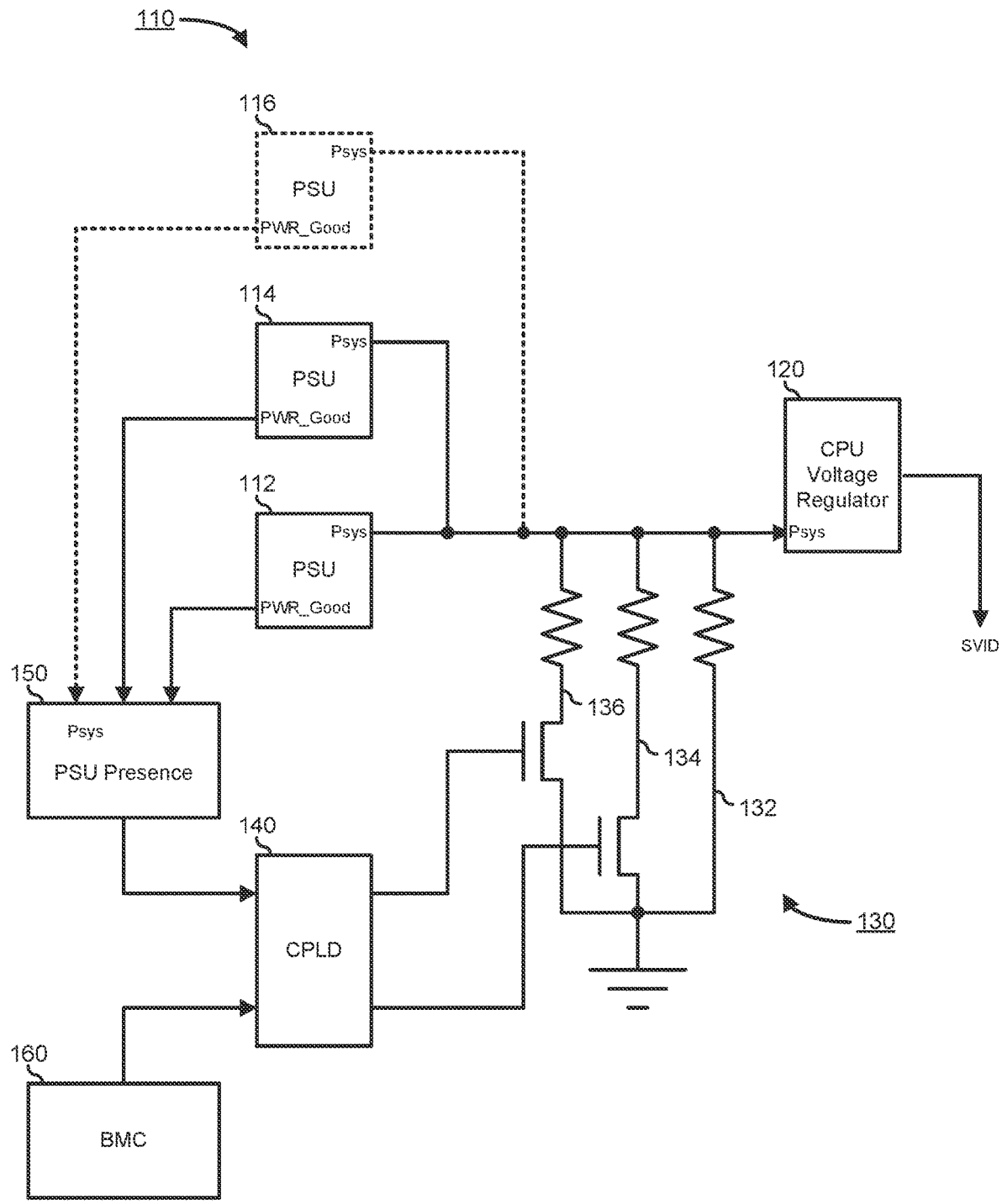
FIG. 1 is a schematic diagram of an information handling system according to an embodiment of the disclosure.
Figure 2:
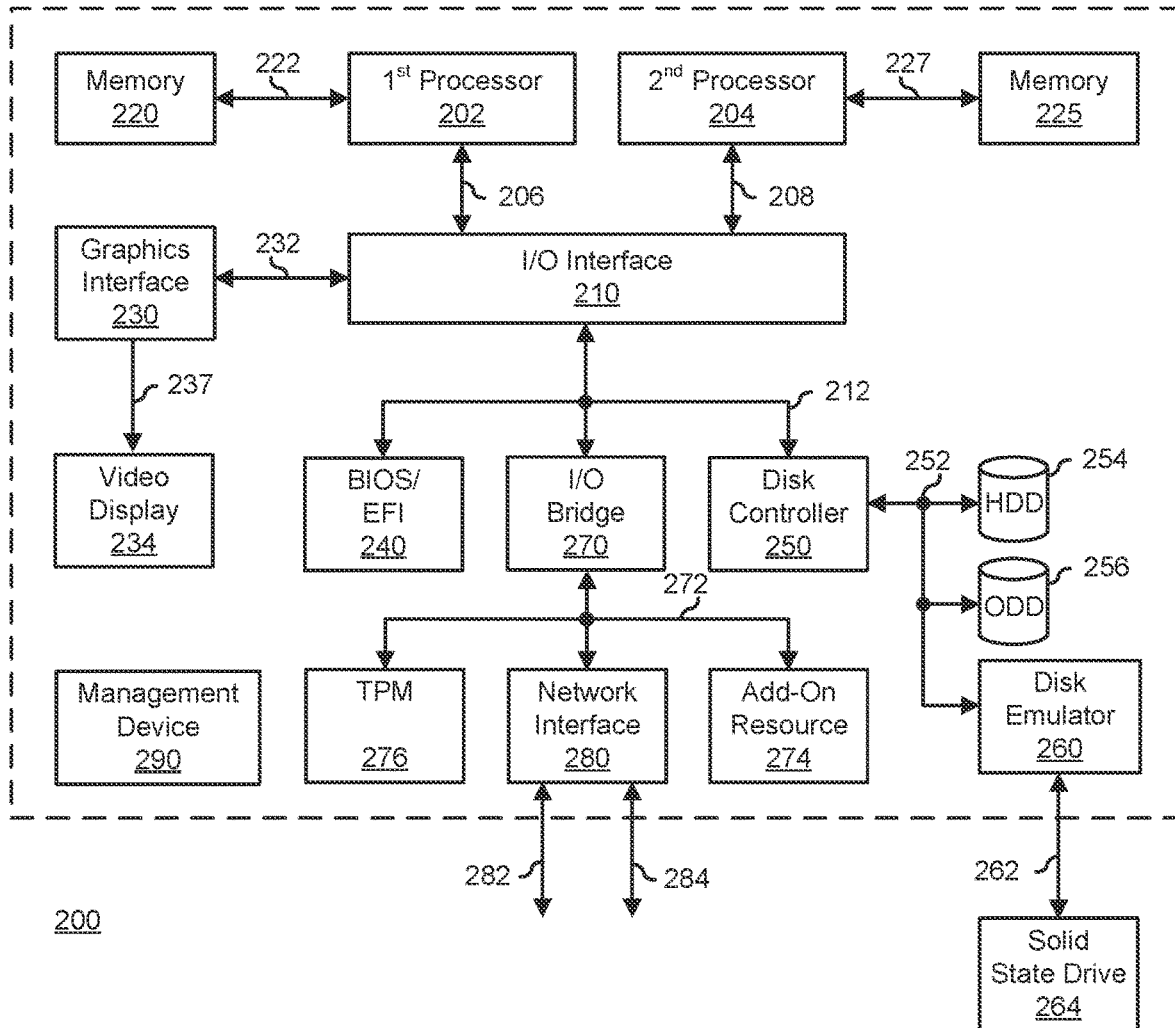
FIG. 2 is a block diagram of a general information handling system according to an embodiment of the present disclosure.

FIG. 1 illustrates a power control system 100 including a power supply module 110, a CPU voltage regulator 120, a system power (Psys) resistor network 130, a complex programmable logic device 140, a power supply unit (PSU) presence detect module 150, and a baseboard management controller 160. Power control system 100 represents a portion of the power control logic that may be associated with the information handling system 200 as shown in FIG. 2. In particular, power control system 100 may be understood to represent a portion of the power control logic associated with an information handling system such as a server, a modular chassis system, or other information handling systems as may be found in a datacenter application or other application that benefits from the implementation of redundant and hot-swappable functional elements such as may be found in a power supply module like power supply module 110.

As such, power supply module 110 includes multiple bays 112, 114, and 116 that are each configured to receive a PSU that supplies system power to the associated information handling system. Each of bays 112, 114, and 116 may be configured to provide one or more power rails to power various elements of the associated information handling system, as needed or desired. However, such power rails are omitted from the illustration of power supply module 100 for the sake of clarity of illustration.

Where bays 112 and 114 are illustrated with solid outlines and solid connections, the bays are populated with associated PSUs, and where bay 116 is illustrated with a dotted outline and connections, that bay is not populated with an associated PSU. Thus the terms PSU and bay may be utilized synonymously, and other combinations of population of bays with PSUs may be utilized as needed or desired. For example all three bays 112, 114, and 116 may be populated with PSU, only one of the bays may be populated with a PSU 114, or other combinations of two bays populated with PSUs may be provided. An information handling system that includes a power control system similar to power control system 100 may be provided with any number greater than two (2) bays, as needed or desired.

Processor manufacturers such as Intel, AMD, and the like, have determined that an accurate indication of the instantaneous system power permits the operation of their CPUs more efficiently. As such PSUs 112, 114, and 116 are configured to provide a system power (Psys) indication that accurately reflects the amount of power being supplied by the respective PSUs. In particular, the Psys indication is an analog current where the current level is indicative of the amount of power being supplied by the associated PSU 112, 114, or 116. The output current is driven through Psys resistor network 130 so as to present a voltage on a Psys input of CPU voltage regulator 120 to indicate the level of power consumption in the information handling system. Psys resistor network 130 includes multiple resistor stages 132, 134, and 136 that selectably shunt the Psys indications from PSUs 112, 114, and 116 to ground to provide a voltage on the Psys input.

In a particular example, Psys resistor network 130 is configured with resistors in stages 132, 134, and 136 that are sized such that the current provided by the Psys indications when the information handling system is consuming the maximum amount of power results in a voltage on the Psys input of less than or equal to 1.2 V. The Psys input of CPU voltage regulator 120 represents an analog-to-digital converter that digitizes the input voltage for use by the CPU voltage regulator in providing a voltage id (SVID) indication to the processors of the information handling system. The use of the Psys indication by a CPU voltage regulator is known in the art and will not be further described herein, except as may be needed to illustrate the current embodiments.

It has been understood by the inventors of the current disclosure that the sizing of the resistance of a single stage 132, 134, or 136 of Psys resistor network 130 is trivially achieved for a single PSU 112, 114, or 116, by the equation:

$$R = V/I \qquad \text{Equation 1}$$

where R is the needed resistance value, V is, e.g., 1.2V, and I is the current provided by the PSUs to indicate the maximum power consumption of a single PSU. However, it has been further understood that the sizing of the stages under the operating conditions with multiple PSUs present significant challenges. For example, Psys resistor network 130 desirably provides the maximum resolution to the Psys input while preventing the voltage level from exceeding the (for example) 1.2V maximum. Such should remain the case during the transient conditions that occur when one of PSUs 112, 114, and 114 unexpectedly fails or is added or removed from power control system 100. Further, Psys resistor network 130 should be configurable to manage configuration changes to the information handling system, such as the hot-swapping of PSUs or other components.

In the default configuration a single PSU 112, 114, or 116 is accounted for by the fact that stage 132 is not shunted to ground, but is fixed to shunt the Psys output to ground to provide a signal voltage to the Psys input. Then based upon one of three different embodiments, as described below, CPLD 140 is configured to shunt one (1) or two (2) of stages 134 and 136, based upon the addition of one (1) or two (2) of PSUs 114 and 116. In particular, CPLD 140 includes a separate general purpose I/O (GPIO) to enable respective stages 134 and 136 to account for the addition of the PSUs.

In a particular embodiment PSUs 112, 114, and 116 each include a power good (PWR_Good) indication that is asserted when the power rails provided by the respective PSU has stabilized upon power up, and remains asserted as long as the power rails are maintained at the correct voltages. The PWR_Good indications are provided to PSU presence module 150, and the PSU presence module provides an indication as to the number of PSUs that are installed in power supply module 110. Then if two (2) PSUs are installed into power supply module 110, then CPLD 150 asserts a single GPIO to shunt one (1) of stages 134 or 136 to ground, and if three (3) PSUs are installed into the power supply module, then the CPLD asserts a both GPIOs to shunt both of stages 134 or 136 to ground. However the current embodiment was found to provide inadequate resolution on the Psys input, and resulted in unacceptable transients on the Psys input when PSUs were added or removed. The resolution issue was based upon the fact that a normal operating condition for the information handling system is to have redundant PSUs in case of a PSU failure. For example where one (1) PSU has sufficient output to power the information handling system, it is common practice to nevertheless install two (2) such PSUs so that, if one PSU fails, the second PSU can carry the load. However if two (2) of stages 132, 134, and 136 are switched in to PSU resistor network 130, then a maximum power output state would only indicate at half the peak voltage (for example at 0.6V instead of 1.2V) on the Psys input of CPU voltage regulator 120.

In the following embodiments BMC 160 manages the power states of the information handling system, including the monitoring, managing, and maintaining of the power budget and system power levels within the information handling system. BMC 160 is aware of the number of PSUs that are installed into power supply module 110. For example BMC 160 may be connected to PSUs 112, 114, and 116 via a management communication bus, such as a SMBus or the like, and so can be informed when the PSUs are added or removed. Further BMC 160 applies various algorithms for the enabling of stages 134 and 136, based upon various operating conditions within the information handling system and power control system 100, as described further below.

In a next embodiment, BMC 160 selects the number of stages 134 and 136 to enable based upon the number of PSUs that are needed to maintain redundancy. Continuing the example above where a single PSU has sufficient output to power the information handling system, then a single additional PSU would be needed to provide the requisite redundancy. In this case BMC 160 operates to direct CPLD 150 to assert a single GPIO to shunt one (1) of stages 134 or 136 to ground. This embodiment was found by the inventors of the current disclosure to improve both the resolution issue and the transient issue of the previous embodiment. However in the event of a PSU failure, the current embodiment was yet found to provide Psys signal voltages that exceeded the peak input range (that is, 1.2V) due to peak power transients on one or more of the PSUs.

In a third embodiment, BMC 160 determines a peak power inventory and budget for the information handling system, and to optimize Psys resistor network 130 based upon the peak power inventory and budget. The resistors in stages 132, 134, and 136 are sized such that the maximum input voltage (that is, 1.2V) to the Psys input of CPU voltage regulator 120 represents a higher power level than the maximum continuous output power of PSUs 112, 114, or 116, in order to account for higher transient power levels. In a particular example, the resistors of stage 132, 134, and 136 are sized such that the maximum input voltage (that is, 1.2V) to the Psys input of CPU voltage regulator 120 represents 150% of the maximum continuous output power. Then a peak power budget for the information handling system and PSUs 112, 114, and 116 (Peak_Power) is determined and programmed at the power on self test (POST) for the information handling system. Then:

$$PsysRCount = RoundUp(\text{Peak\_Power} / (\text{PSU\_Capacity} * 150\%)) \qquad \text{Equation 1}$$

where PsysRCount is the number of stages 132, 134, and 136 that are enabled. For example, where an information handling system includes four (4) PSUs, each rated at 2,800 W PSUs installed, and where the peak power budget is determined to be 4, 100 W, then:

$$PsysRCount = \\ RoundUp(4,100\ W / (2,800\ W * 150\%)) = 1\ \text{Resistor}. \quad \text{Equation 2}$$

And where an information handling system includes two (2) PSUs, each rated at 2,800 W PSUs installed, and where the peak power budget is determined to be 5,000 W, then:

$$PsysRCount = RoundUp(5,000\ W / (2,800\ W * 150\%)) = 2\ \text{Resistors}. \quad \text{Equation 3}$$

This method to calculate the number of Psys resistors using the power budget and PSU capacity maximizes the A-to-D resolution for the given configuration and prevents the VR pin from exceeding 1.2V even when there is a PSU failure, as the number of resistors is constant after BIOS POST. In the embodiments described above, runtime changes to Psys resistor network 130 likewise necessitate a change the A-to-D gain of the Psys input of CPU voltage regulator 120 which results in greater transients. In contrast, the current embodiment determines the number of PSUs 112, 114, and 116 are needed based upon the power budget, which does not change unless the configuration of the associated information handling system is changed. Further, the information handling system recalculates the needed number of stages 132, 134, and 136 to enable each time the information handling system is re-booted.

In particular, each time the information handling system is booted, the number of stages is recalculated and stored in a non-volatile memory location. Then, on each subsequent boot, the recalculated value is compared with the stored value. If the recalculated value matches the cached value, then the system continues to boot. On the other hand, if the recalculated value does not match the stored value, then the stored value is updated, BMC 160 issues a cold boot and directs CPLD 140 to enable the correct number of stages 132, 134, or 136, and the system reboots with the stored value and the recalculated matching.

FIG. 2 illustrates a generalized embodiment of an information handling system 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 200 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 200 can include processing resources for executing machine-executable code, such as a central processing unit (CPU), a programmable logic array (PLA), an embedded device such as a System-on-a-Chip (SoC), or other control logic hardware. Information handling system 200 can also include one or more computer-readable medium for storing machine-executable code, such as software or data. Additional components of information handling system 200 can include one or more storage devices that can store machine-executable code, one or more communications ports for communicating with external devices, and various input and output (I/O) devices, such as a keyboard, a mouse, and a video display. Information handling system 200 can also include one or more buses operable to transmit information between the various hardware components.

Information handling system 200 can include devices or modules that embody one or more of the devices or modules described below, and operates to perform one or more of the methods described below. Information handling system 200 includes a processors 202 and 204, an input/output (I/O) interface 210, memories 220 and 225, a graphics interface 230, a basic input and output system/universal extensible firmware interface (BIOS/UEFI) module 240, a disk controller 250, a hard disk drive (HDD) 254, an optical disk drive (ODD) 256, a disk emulator 260 connected to an external solid state drive (SSD) 262, an I/O bridge 270, one or more add-on resources 274, a trusted platform module (TPM) 276, a network interface 280, a management device 290, and a power supply 295. Processors 202 and 204, I/O interface 210, memory 220, graphics interface 230, BIOS/UEFI module 240, disk controller 250, HDD 254, ODD 256, disk emulator 260, SSD 262, I/O bridge 270, add-on resources 274, TPM 276, and network interface 280 operate together to provide a host environment of information handling system 200 that operates to provide the data processing functionality of the information handling system. The host environment operates to execute machine-executable code, including platform BIOS/UEFI code, device firmware, operating system code, applications, programs, and the like, to perform the data processing tasks associated with information handling system 200.

In the host environment, processor 202 is connected to I/O interface 210 via processor interface 206, and processor 204 is connected to the I/O interface via processor interface 208. Memory 220 is connected to processor 202 via a memory interface 222. Memory 225 is connected to processor 204 via a memory interface 227. Graphics interface 230 is connected to I/O interface 210 via a graphics interface 232, and provides a video display output 236 to a video display 234. In a particular embodiment, information handling system 200 includes separate memories that are dedicated to each of processors 202 and 204 via separate memory interfaces. An example of memories 220 and 230 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 240, disk controller 250, and I/O bridge 270 are connected to I/O interface 210 via an I/O channel 212. An example of I/O channel 212 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 210 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 240 includes BIOS/UEFI code operable to detect resources within information handling system 200, to provide drivers for the resources, initialize the resources, and access the resources. BIOS/UEFI module 240 includes code that operates to detect resources within information handling system 200, to provide drivers for the resources, to initialize the resources, and to access the resources.

Disk controller 250 includes a disk interface 252 that connects the disk controller to HDD 254, to ODD 256, and to disk emulator 260. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 260 permits SSD 264 to be connected to information handling system 200 via an external interface 262. An example of external interface 262 includes a USB interface, an IEEE 2394 (Firewire) interface, a proprietary interface, or a combination thereof. Alternatively, solid-state drive 264 can be disposed within information handling system 200.

I/O bridge 270 includes a peripheral interface 272 that connects the I/O bridge to add-on resource 274, to TPM 276, and to network interface 280. Peripheral interface 272 can be the same type of interface as I/O channel 212, or can be a different type of interface. As such, I/O bridge 270 extends the capacity of I/O channel 212 when peripheral interface 272 and the I/O channel are of the same type, and the I/O bridge translates information from a format suitable to the I/O channel to a format suitable to the peripheral channel 272 when they are of a different type. Add-on resource 274 can include a data storage system, an additional graphics interface, a network interface card (NIC), a sound/video processing card, another add-on resource, or a combination thereof. Add-on resource 274 can be on a main circuit board, on separate circuit board or add-in card disposed within information handling system 200, a device that is external to the information handling system, or a combination thereof.

Network interface 280 represents a NIC disposed within information handling system 200, on a main circuit board of the information handling system, integrated onto another component such as I/O interface 210, in another suitable location, or a combination thereof. Network interface device 280 includes network channels 282 and 284 that provide interfaces to devices that are external to information handling system 200. In a particular embodiment, network channels 282 and 284 are of a different type than peripheral channel 272 and network interface 280 translates information from a format suitable to the peripheral channel to a format suitable to external devices. An example of network channels 282 and 284 includes InfiniBand channels, Fibre Channel channels, Gigabit Ethernet channels, proprietary channel architectures, or a combination thereof. Network channels 282 and 284 can be connected to external network resources (not illustrated). The network resource can include another information handling system, a data storage system, another network, a grid management system, another suitable resource, or a combination thereof.

Management device 290 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 200. In particular, management device 290 is connected to various components of the host environment via various internal communication interfaces, such as a Low Pin Count (LPC) interface, an Inter-Integrated-Circuit (I²C) interface, a PCIe interface, or the like, to provide an out-of-band (OOB) mechanism to retrieve information related to the operation of the host environment, to provide BIOS/UEFI or system firmware updates, to manage non-processing components of information handling system 200, such as system cooling fans and power supplies. Management device 290 can include a network connection to an external management system, and the management device can communicate with the management system to report status information for information handling system 200, to receive BIOS/UEFI or system firmware updates, or to perform other task for managing and controlling the operation of information handling system 200. Management device 290 can operate off of a separate power plane from the components of the host environment so that the management device receives power to manage information handling system 200 when the information handling system is otherwise shut down. An example of management device 290 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 290 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
 a processor voltage regulator configured to receive a system power level indication and to provide power to a processor based upon the system power level indication;
 a system power level indication network including a plurality of resistor stages, a first resistor stage coupled to shunt the system power level indication to a ground plane, and a second resistor stage selectably coupled to shunt the system power level indication to the ground plane;
 a first power supply unit configured to provide the system power level indication as a first current output, wherein a level of first current output indicates a first power level provided by the first power supply to the information handling system; and a baseboard management controller configured to determine a power budget (System_Power) for the information handling system, to calculate a number of resistor stages to couple to the ground plane based on the power budget, when the number of resistor stages is less than or equal to one (1) to select the second resistor stage to be uncoupled from the ground plane, and when the number of resistor stages is greater than one (1) to select the second resistor stage to be coupled to the ground plane.

2. The information handling system of claim 1, further comprising a second power supply unit configured to provide the system power level indication as a second current output wherein a level of second current output indicates a second power level provided by the second power supply to the information handling system.

3. The information handling system of claim 2, wherein the system power indication is based upon a sum of the first current level and the second current level.

4. The information handling system of claim 3, wherein the system power indication is provided as a voltage to the processor voltage regulator.

5. The information handling system of claim 1, wherein the first power supply is configured to provide a maximum continuous power output (PSU_Capacity).

6. The information handling system of claim 5, wherein the number of resistor stages is determined as N=RoundUp(System_Power/(PSU_Capacity*K)), where K is a constant.

7. The information handling system of claim 6, wherein K is 150% in order to account for a peak power level indication from the first power supply that is greater than the maximum continuous power output (PSU_Capacity).

8. The information handling system of claim 7, wherein the processor voltage regulator is configured to receive the system power level indication as a voltage range with a maximum voltage.

9. The information handling system of claim 8, wherein system power level indication network is configured to provide the maximum voltage when the power supply is providing 150% of the maximum continuous power output (PSU_Capacity).

10. The information handling system of claim 1, wherein the BMC determines the power budget (System_Power) for the information handling system when the information handling system is booted.

11. A method, comprising:
providing, on an information handling system, a processor voltage regulator configured to receive a system power level indication and to provide power to a processor based upon the system power level indication;
providing, on the information handling system, a system power level indication network including a plurality of resistor stages, a first resistor stage coupled to shunt the system power level indication to a ground plane, and a second resistor stage selectably coupled to shunt the system power level indication to the ground plane;
providing, on the information handling system, a first power supply unit configured to provide the system power level indication as a first current output, wherein a level of first current output indicates a first power level provided by the first power supply to the information handling system;
determining, by a baseboard management controller of the information handling system, a power budget (System_Power) for the information handling system;
calculating a number of resistor stages to couple to the ground plane based on the power budget;
when the number of resistor stages is less than or equal to one (1), selecting the second resistor stage to be uncoupled from the ground plane; and
when the number of resistor stages is greater than one (1), selecting the second resistor stage to be coupled to the ground plane.

12. The method of claim 11, further comprising providing a second power supply unit configured to provide the system power level indication as a second current output wherein a level of second current output indicates a second power level provided by the second power supply to the information handling system.

13. The method of claim 12, wherein the system power indication is based upon a sum of the first current level and the second current level.

14. The method of claim 13, wherein the system power indication is provided as a voltage to the processor voltage regulator.

15. The method of claim 11, wherein the first power supply is configured to provide a maximum continuous power output (PSU_Capacity).

16. The method of claim 15, wherein the number of resistor stages is determined as N=RoundUp(System_Power/(PSU_Capacity*K)), where K is a constant.

17. The method of claim 16, wherein K is 150% in order to account for a peak power level indication from the first power supply that is greater than the maximum continuous power output (PSU_Capacity).

18. The method of claim 17, wherein the processor voltage regulator is configured to receive the system power level indication as a voltage range with a maximum voltage.

19. The method of claim 18, wherein system power level indication network is configured to provide the maximum voltage when the power supply is providing 150% of the maximum continuous power output (PSU_Capacity).

20. An information handling system, comprising:
a processor voltage regulator configured to receive a system power level indication and to provide power to a processor based upon the system power level indication;
a system power level indication network including a first and second resistor stages, the first resistor stage coupled to shunt the system power level indication to a ground plane, and the second resistor stage selectably coupled to shunt the system power level indication to the ground plane;
a first power supply unit configured to provide the system power level indication as a first current output, wherein a level of first current output indicates a first power level provided by the first power supply to the information handling system; and
a baseboard management controller configured to determine a power budget (System_Power) for the information handling system, to calculate a number of resistor stages to couple to the ground plane based on the power budget, when the number of resistor stages is less than or equal to one (1), to select the second resistor stage to be uncoupled from the ground plane, and when the number of resistor stages is greater than one (1), to select the second resistor stage to be coupled to the ground plane.

* * * * *